United States Patent [19]

Watanabe et al.

[11] Patent Number: 5,481,705
[45] Date of Patent: Jan. 2, 1996

[54] METHOD FOR EXECUTING A PROGRAM WITH BRANCH-TO MODIFYING INSTRUCTIONS

[75] Inventors: Hitoshi Watanabe, Yokohama; Tsuneaki Kadosawa, Kanagawa; Takashi Nakamura, Hiratsuka; Eiji Koga, Hadano; Satoshi Asada, Tokyo, all of Japan

[73] Assignee: Canon Kabushiki Kaisha, Tokyo, Japan

[21] Appl. No.: 82,858

[22] Filed: Jun. 28, 1993

[30] Foreign Application Priority Data

Jun. 29, 1992 [JP] Japan ................ 4-192838

[51] Int. Cl.⁶ ............................................. G06F 9/32
[52] U.S. Cl. .................. 395/650; 395/375; 364/DIG. 1; 364/261.3; 364/261.9
[58] Field of Search ..................... 395/700, 375, 395/650; 364/261.3

[56] References Cited

U.S. PATENT DOCUMENTS

| | | | |
|---|---|---|---|
| 4,439,828 | 3/1989 | Martin | 364/200 |
| 4,827,402 | 5/1989 | Wada | 364/200 |
| 4,954,947 | 9/1990 | Kuriyama et al. | 364/200 |
| 5,034,880 | 7/1991 | Fong et al. | 364/200 |
| 5,072,364 | 12/1991 | Jardine et al. | 395/375 |
| 5,099,419 | 3/1992 | Nomura | 395/375 |
| 5,193,156 | 3/1993 | Yoshida et al. | 395/375 |
| 5,263,153 | 11/1993 | Intrater et al. | 395/575 |

OTHER PUBLICATIONS

"Menu and Graphic Driven Human Interfaces for High Level Debuggers" by Thomas Bemmerl et al., Microprocessing and microprogramming; vol. 24, No. 1–5, Aug. 1988, Amsterdam, NL, pp. 153–159.

"Software development and debugging in embedded systems: maintaining the high–level view", Electro; vol. 11, No. 22/4, 1986, Los Angeles, US.; p. 6.

*Primary Examiner*—Kevin A. Kriess
*Attorney, Agent, or Firm*—Fitzpatrick, Cella, Harper & Scinto

[57] ABSTRACT

In a method for executing a program for sequentially reading step information registered in an execution queue in the order of registration in order to permit the modification of a branch-to address with ease and without error when the modification of the branch-to address is instructed during the debugging of the program, the step information which is no longer the branch-to address due to the modification is searched in response to the branch-to address modification instruction, the retrieved step information is erased from the execution queue, and step information which is a new branch-to address is registered at the position of the erased step.

12 Claims, 3 Drawing Sheets

METHOD FOR EXECUTING A PROGRAM WITH BRANCH-TO MODIFYING INSTRUCTIONS

BACKGROUND OF THE INVENTION

1. Field of the Invention

The present invention relates to a method for executing a program by sequentially executing instructions in the program.

2. Related Background Art

In a prior art method for executing a program, when a flow of the program is to be branched to a different direction from a normal direction during the debugging of the program having a branch point, the execution of the program is temporarily interrupted before the branch point and a variable is changed at the branch point to change a branch condition which determines the direction of the branch from a predetermined one to indirectly change the direction of the branch.

In executing the program branching of this type, that is, when the direction of the branch of the program is to be changed, an operator must analyze the branch condition of the program and manually change the content of the variable so that the program is correctly branched to the desired direction. In this method, where the branch condition of the program is complex, the analysis of the branch condition is difficult to attain and the decision for the variable (the number of variables to be changed is not necessarily one) and the content of the change of the variable to attain the branch in the desired direction must be manually determined. Accordingly, the burden to the operator increases and a probability of misoperation increases. Further, it may happen that the program makes an unexpected operation at a different point because of the change of the content of the variable, and if it is a control program for an equipment, a significant damage may be imparted to the overall system.

SUMMARY OF THE INVENTION

It is an object of the present invention to provide a method for executing a program which permits the change of a branch-to-address with ease and without error when the change of the branch-to address is instructed during the debugging of the program.

According to one aspect, the present invention which achieves the above object relates to a method for executing a program having a plurality of steps to be executed, comprising the steps of: registering information of the steps to be executed in a queue in the order of execution, searching the information of the step which is no longer a branch-to address due to the change from the queue in accordance with a change branch-to address command, erasing the information of the retrieved step from the queue, registering information of a step of a new branch-to address at the position of the erased step, reading the information of the steps registered in the queue in the order of registration, and executing the steps corresponding to the information of the read steps.

Other objects and advantages besides those discussed above shall be apparent to those skilled in the art from the description of the preferred embodiments of the invention which follows. In the description, 10 reference is made to the accompanying drawings, which form a part hereof, and which illustrate examples of the invention. Such examples, however, are not exhaustive of various embodiments of the invention, and therefore reference is made to the claims which follow the description for determining the scope of the invent ion.

DETAILED DESCRIPTION OF THE PREFERRED EMBODIMENT

An embodiment of the present invention will now be explained with reference to the drawings.

Figure 1:
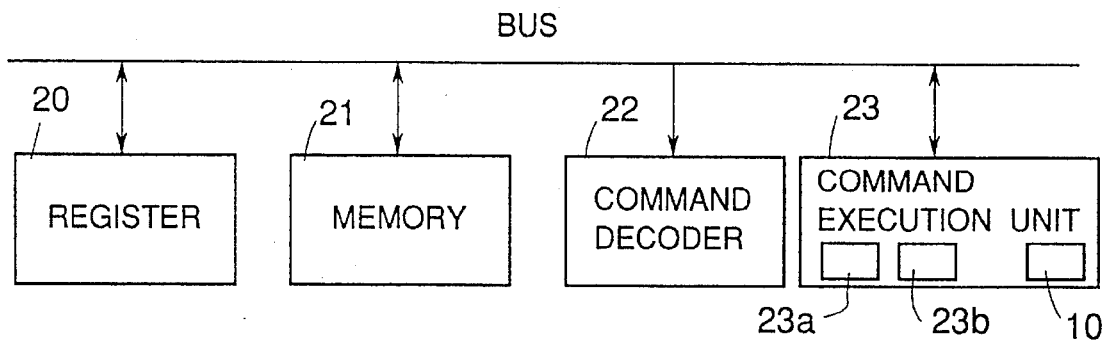
FIG. 1 shows a block diagram of a configuration of an information processing apparatus for realizing the present invention.

FIG. 1 shows a block diagram of a configuration of an information processing system for realizing a method for executing a program of the present invention.

Numeral 20 denotes a register for temporarily storing data or an operation result and numeral 21 denotes a memory for storing programs or data. A user program and a monitor program are stored as the programs. The program stored in the memory 21 is sent to an instruction decoder 22 through a bus 24 and decoded thereby, and the decoded result is sent to an instruction execution unit 23 and executed thereby. In the present embodiment, a step represents a minimum division unit for processing the program and the program comprises an aggregation of steps.

In the information processing apparatus thus constructed, when a branch-to address modification based on a debug program is instructed by the instruction execution unit 23 while a plurality of numbers of steps to be executed are registered in the queue (an execution queue of a step number registration unit 10), the instruction execution unit 23 erases the step number which has been registered in the queue but is not to be executed, and re-registers the modified step at the same position as that at which the erased step has been registered to correctly modify the branch-to address of the program to a desired direction.

Figure 2:
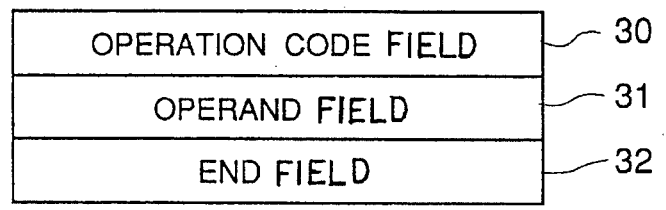
FIG. 2 shows a chart of a format of a step which is a unit of process.

FIG. 2 shows a schematic diagram of a format of the step processed by the information processing apparatus shown in FIG. 1.

In FIG. 2, numeral 30 denotes an operation code field which defines a type of instruction to be executed. Numeral 31 denotes an operand field which defines detail of the instruction to be executed. Numeral 32 denotes an end field which defines a step number to be executed next.

In the information processing apparatus of the present embodiment, since the step is defined by the format shown in FIG. 2, the monitor program refers the operation code field 30 to determine the type of instruction to be executed. Then, the monitor program refers the operand field 31 to detect the detail of the instruction to be executed and determine the type of instruction to be executed as well as a job to be done by a CPU and issues a group of instructions to the CPU. The end field 32 contains the step number to be executed next, and the monitor program refers the end field 32 to determine the step to be executed next.

Figure 3:
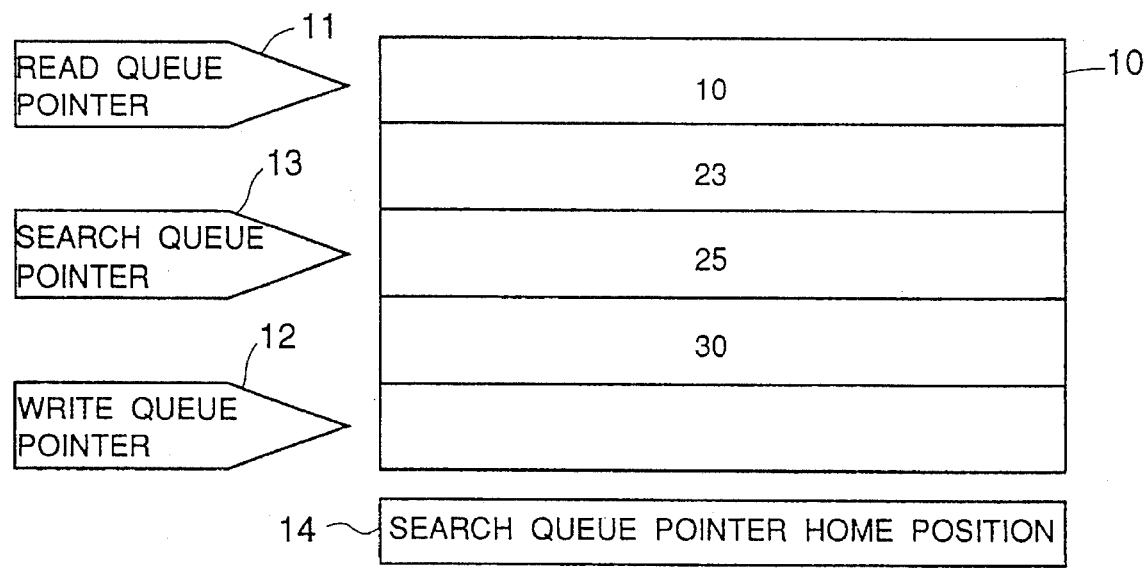
FIG. 3 shows a structure of a command execution queue.

FIG. 3 shows a structure of the instruction queue in the instruction execution unit 23 shown in FIG. 1.

In FIG. 3, numeral 10 denotes a step number registration unit in which currently queuing step number is registered. Numeral 11 denotes a read queue pointer pointing the currently executed step. Numeral 12 denotes a write queue pointer pointing a location of registration of the step number to be registered next. Numeral 13 denotes a search queue pointer for searching the step number whose execution is to be cancelled by the modification of the branch-to address of the program and holding that location in the execution queue until a replacement step number is registered, and numeral 14 denotes a search queue pointer home position.

An instruction execution operation in the information processing apparatus of the present invention is now explained with reference to FIG. 4.

Figure 4:
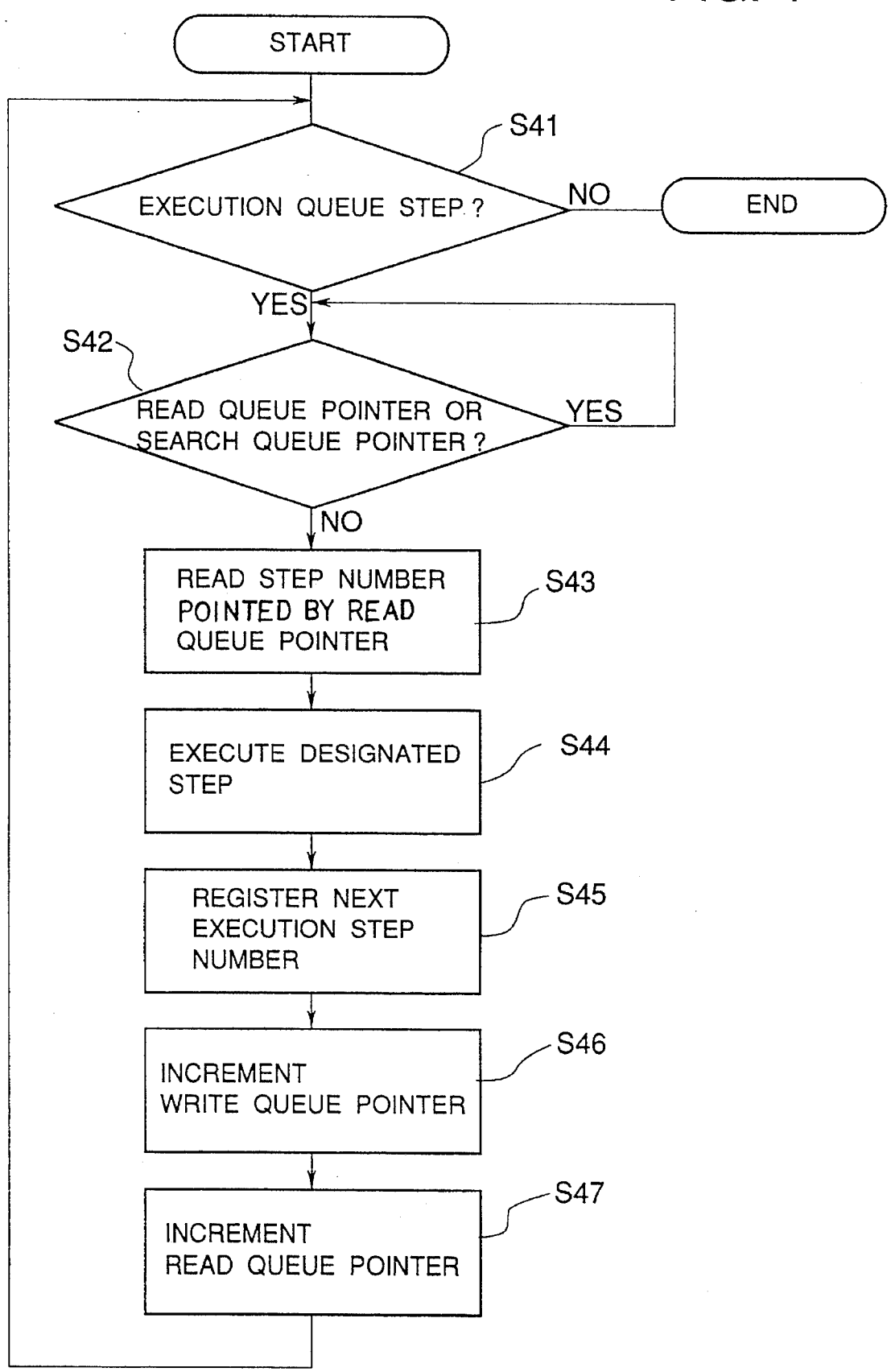
FIG. 4 shows a flow chart of a program execution management process.

FIG. 4 shows a flow chart of an example of a program execution management process in the information processing apparatus of the present invention. It is assumed that a step has already been registered in the execution queue (the read pointer and the write pointer shown in FIG. 3 do not match).

First, the monitor program checks in a step S41 whether there is a step waiting for the execution in the queue, and if there is such a step, the monitor program checks in a step S42 whether the read queue pointer 11 matches to the search queue pointer 13. If it matches, the process waits until mismatching occurs, and in a step S43, the monitor program reads the step number from the position pointed by the read queue pointer 11. In a step S44, the monitor program causes the step corresponding to the read step by the CPU, not shown. When the execution of that step has been completed, the monitor program refers the end field 32 shown in FIG. 2 in a step S45 to determine the step number to be executed next in the program and writes it at the position pointed by the write queue pointer 12.

In a step S46, the write queue pointer 12 is incremented by one. If the write queue pointer 12 exceeds the final stage of the execution queue, a head address of the execution queue is placed in the write queue pointer 12 so that it returns to the head of the execution queue. In a step S47, the read queue pointer 11 is incremented by one. If the read queue pointer 11 exceeds the final stage of the execution queue, the head address of the execution queue is placed in the read queue pointer so that it returns to the head of the execution queue. Then, the process returns to the step S41 to determine whether there is a step waiting for the execution or not, and if there is such a step, the steps S42–S47 are repeated. If there is no such step in the step S41, the process is terminated.

Figure 5:
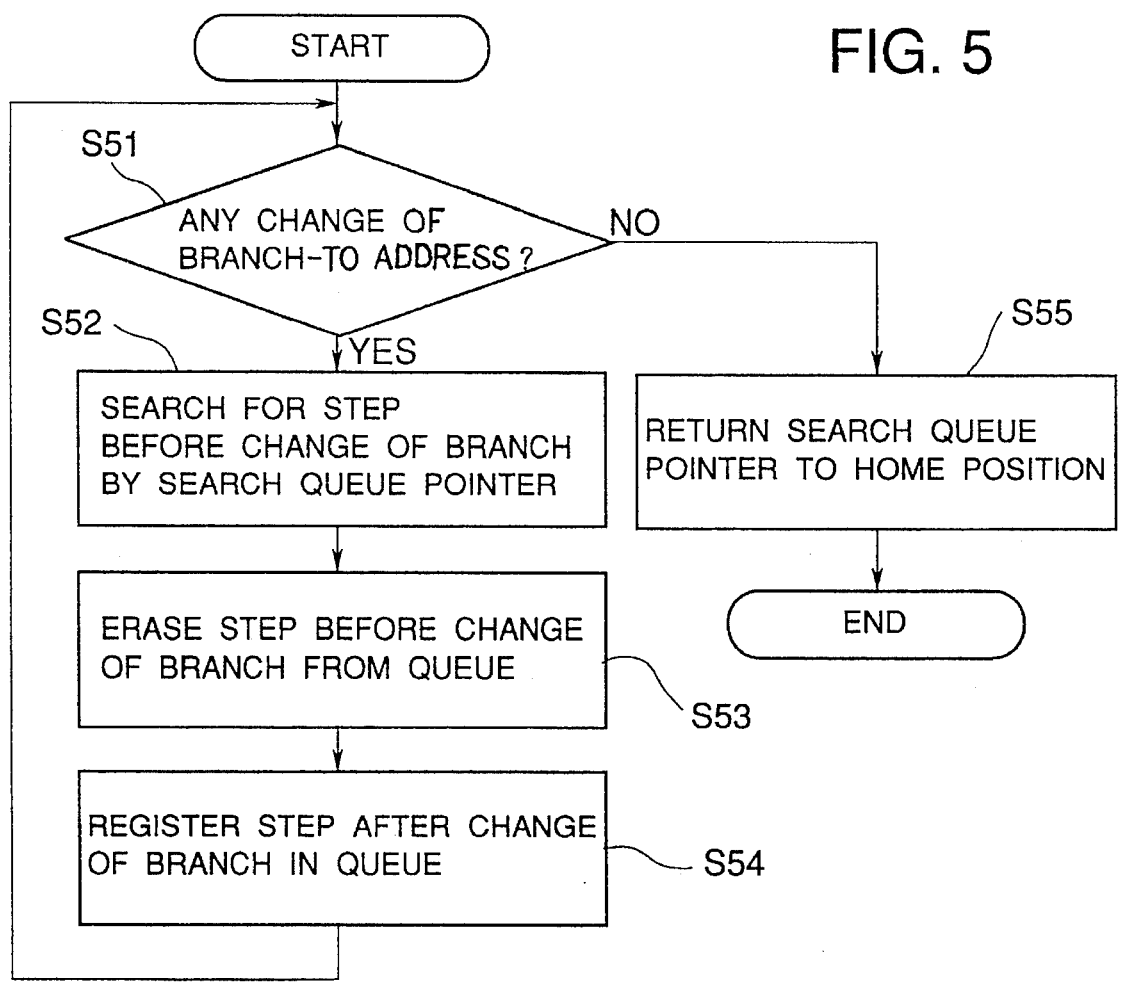
FIG. 5 shows a flow chart of a branch-to address modification process.

FIG. 5 shows a flow chart of an example of a branch-to address modification process in the present invention. This process is separate from the program execution management process shown in FIG. 4 and both processes are executed in parallel. When the branch-to address modification is instructed by the debugger, the monitor program starts the branch-to address modification process.

First, the monitor program determines in a step S51 whether the branch-to address modification has been instructed or not, and if the decision is YES, it shifts the search queue pointer 13 from the search queue pointer home position 14 to the head of the execution queue in a step S52, and searches the step before the modification from the execution queue while it increments the search queue pointer 13. When it finds the step before the modification, it retains the search queue pointer 13 at that position in a step S53 and erases the step before the modification. Then, in a step S54, the step after the modification is registered at the position pointed by the search queue pointer 13, and the process return to the step S51. In the step S51, whether there is another branch-to address modification instruction or not is checked, and if there is, the steps S52–S54 are repeated, and if there is not, the search queue pointer 13 is returned to the search queue pointer home position 14 in a step S55 and the process is terminated.

Figure 6:
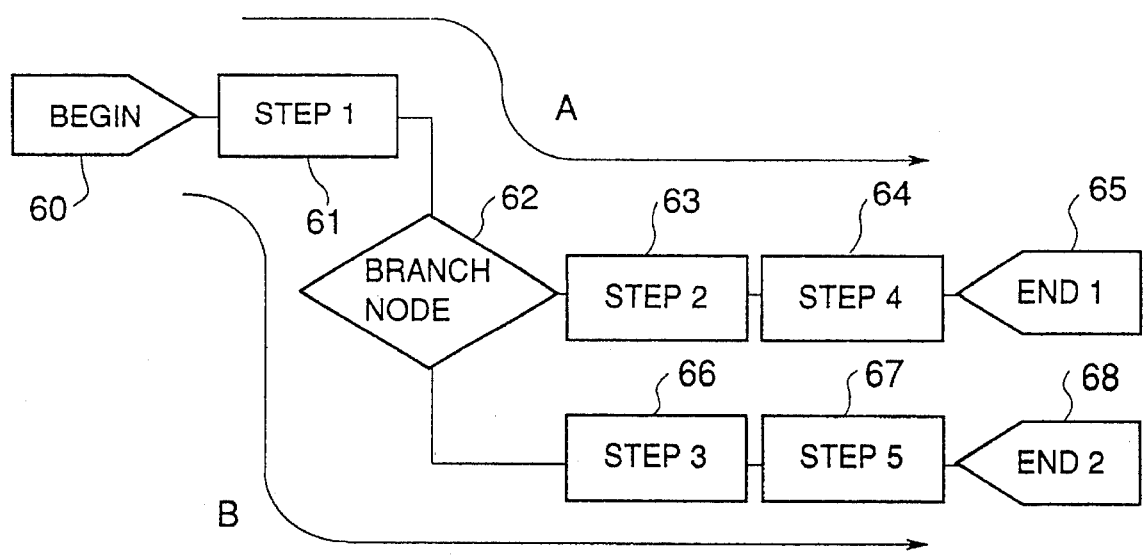
FIG. 6 shows a shift of a process by the branch-to address modification.

FIG. 6 shows a diagram of a shift of the branch-to address modification of the program in the information processing apparatus of the present invention. In the Figure, numerals 60–68 show a sequence of process orders.

It is assumed that the process starts from a process order 60 and normally proceeds in the sequence of process orders 61–65, that is, along an arrow A. In this case, a step 1 shown in the process order 61 is executed, a branch node shown in the process order 62 is execute, a branch condition is determined, and a step 2 shown in the process order 63 is registered in the execution queue. If the branch-to address modification is instructed before the step 2 shown in the process order 63 is executed and the execution of the step 3 shown in the process order 66 instead of the step 2 shown in the process order 63 is instructed, the branch-to address modification process shown in FIG. 5 is started. In the example of FIG. 6, the branch-to address modification process searches the step 2 shown in the process order 63 from the execution queue while it increments the search queue pointer 13. If it finds the step 2 in the execution queue, it retains the search queue pointer 13 at that position in the execution queue and erases the step 2 from the execution queue. Then, it registers the step 3 shown in the process order 66 to the position in the execution queue pointed by the search queue pointer 13, returns the search queue pointer 13 to the search queue pointer home position, and terminates the branch-to address modification process. Thereafter, the program execution management process reads the step number pointed by the read queue pointer 11 from the execution queue and executes it, in a conventional manner. When the step 3 in the process order 66 is executed, the step 5 shown in the process order 67 is registered in the execution queue by the end field of the step 3 and it is registered. Through the above process, the direction of the flow of program is modified from the arrow A to an arrow B in FIG. 6.

Other Embodiment

In the above embodiment, a plurality of locations to register the steps to be next executed are provided in the queue to permit a quasi-parallel processing in which a plurality of programs are executed in the CPU, but it is not essential to the present invention. The present invention is also effective in a system which does not adopt the queue but registers only one step in a register which registers the step to be executed next.

In the above embodiment, it is assumed that the program comprises steps which are minimum units of processing although it is not essential to the present invention. The present invention is readily applicable to a program having a hierarchy structure in which the program is an aggregation of sub-programs which are aggregations of steps.

In the above embodiment, a so-called interpreter 10 system in which the step is structured as shown in FIG. 2 and the monitor program decodes the content thereof to issue a group of instructions of the CPU is adopted although it is not essential to the present invention. The present invention is readily applicable to a so-called compiler system by registering the step to be executed next in the execution queue after the execution of the steps by embedding information of the step to be executed next at portions of the respective steps.

In accordance with the present invention, if the branch-to address modification is instructed by the debug program while one or more steps to be executed are registered, the step which is no longer executed as a result of the branch-to address modification is erased from the registered steps, and the step to be executed as a result of the modification is re-relisted at the same position as that at which the erased step has been registered. Accordingly, the branch-to address of the program can be modified to a desired direction without error.

Accordingly, the troublesome work required in the prior art method to manually modify the content of the variable in the branch condition of the program is eliminated and the burden to the operator is significantly reduced. Further, since it is not necessary to change the content of the variable, the introduction of a new bug due to the modification of the content of the variable is avoided and the program having a branch point can be efficiently debugged.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A method for executing a program by a processor including a plurality of program steps to be executed, comprising the steps of:

registering information of at least one of the program steps to be executed in an order of execution in a queue;

searching information of program steps in the queue in response to an instruction for modifying a branch-to direction from a first direction to a second direction and retrieving information of the program step in the queue which is in the first direction;

erasing the retrieved program step information from the queue;

registering program step information of a program step which is in the second direction at the position of the erased program step in the queue;

sequentially reading the program step information registered in the queue in the order of registration; and executing program steps corresponding to the read program step information.

2. A method for executing a program according to claim 1, wherein a read position in the queue is stored as a pointer address and the pointer address is incremented each time one of the sequential readings is made.

3. A method for executing a program according to claim 1, wherein a position for registering the program step information is stored as a pointer address and the pointer address is modified each time the program step information is registered.

4. A method for executing a program according to claim 2, wherein the position of the retrieved program step is stored as a second pointer address until the program step in the second direction is registered at the same position, and the reading of the program step is inhibited when the pointer address and the second pointer address are the same.

5. A method for executing a program according to claim 1, wherein the information of the program step is a number identifying the program step.

6. A method for executing a program according to claim 5, wherein the number identifying the program step to be executed next is described in a preceding program step, and the number identifying the program step to be executed next is registered after the preceding program step is executed.

7. An apparatus for executing a program including a plurality of program steps to be executed, said apparatus comprising:

first registration means for registering information of at least one of the program steps to be executed in an order of execution in a queue;

retrieval means for searching information of program steps in the queue in response to an instruction for modifying a branch-to direction from a first direction to a second direction and retrieving information of the program step in the queue which is in the first direction;

erasing means for erasing the retrieved program step information from the queue;

second registration means for registering program step information of a program step which is in the second direction at the position of the erased program step in the queue;

reading means for sequentially reading the program step information registered in the queue in the order of registration; and execution means for executing program steps corresponding to the read program step information.

8. An apparatus for executing a program according to claim 7 further comprising:

storing means for storing a read position for said reading means as a pointer address; and increment means for incrementing the pointer address each time one of the sequential readings is made by said reading means.

9. An apparatus for executing a program according to claim 7 further comprising:

storing means for storing a position for registering the program step information as a pointer address; and modifying means for modifying the pointer address each time the program step information is registered by said registration means.

10. An apparatus for executing a program according to claim 8 further comprising:

second storing means for storing the retrieved position of the program step as a second pointer address until the program step in the second direction is registered at the same position; and inhibiting means for inhibiting said reading means to read the program step when the pointer address and the second pointer address are the same.

11. An apparatus for executing a program according to claim 7 wherein the information of the program step is a number identifying the program step.

12. An apparatus for executing a program according to claim 11 wherein the number identifying the program step to be executed next is described in a preceding program step, and said registration means registers the number of identifying the program step to be executed next after the preceding program step is executed.

* * * * *

UNITED STATES PATENT AND TRADEMARK OFFICE
CERTIFICATE OF CORRECTION

PATENT NO. : 5,481,705
DATED : January 2, 1996
INVENTOR(S) : Hitoshi Watanabe

It is certified that error appears in the above-indentified patent and that said Letters Patent is hereby corrected as shown below:

COLUMN 1

Line 36,   "an equipment, a" should read --equipment,--;
  Line 43,   "branch-to-address" should read --branch-to address--;
  Line 64,   "10reference" should read --reference--.

COLUMN 2

Line 3,    "invent ion." should read --invention.--.

COLUMN 4

Line 20,   "execute," should read --executed,--;
  Line 62,   "10" should be deleted.

UNITED STATES PATENT AND TRADEMARK OFFICE
CERTIFICATE OF CORRECTION

PATENT NO. : 5,481,705
DATED : January 2, 1996
INVENTOR(S) : Hitoshi Watanabe

It is certified that error appears in the above-indentified patent and that said Letters Patent is hereby corrected as shown below:

COLUMN 5

Line 20, "10" should be deleted.

COLUMN 6

Line 32, "claim 7" should read --claim 7,--;
Line 39, "claim 7" should read --claim 7,--;
Line 46, "claim 8" should read --claim 8,--;
Line 56, "claim 7" should read --claim 7,--;
Line 59, "claim 11" should read --claim 11,--;
Line 61, "of" should be deleted.

Signed and Sealed this

Twenty-fifth Day of June, 1996

Attest:

BRUCE LEHMAN

Attesting Officer     Commissioner of Patents and Trademarks